United States Patent

Schnizler, Jr. et al.

[11] 3,988,656
[45] Oct. 26, 1976

[54] MOTOR SPEED CONTROL FOR POWER TOOL

[75] Inventors: Albrecht Schnizler, Jr., Nurtingen; Dietrich Holzwarth, Pfullingen, both of Germany

[73] Assignee: Metabowerke KG Closs, Rauch & Schnizler, Nuertingen, Germany

[22] Filed: July 3, 1974

[21] Appl. No.: 485,732

[30] Foreign Application Priority Data
July 4, 1973 Germany............................ 2334013

[52] U.S. Cl. ................................................ 318/345
[51] Int. Cl.² ........................................... H02P 7/28
[58] Field of Search.................... 318/331, 345, 347

[56] References Cited
UNITED STATES PATENTS

| | | | |
|---|---|---|---|
| 3,209,228 | 9/1965 | Gawron | 318/345 |
| 3,278,821 | 10/1966 | Gutzwiller | 318/345 X |
| 3,327,196 | 6/1967 | Sahrbacker | 318/345 |
| 3,328,613 | 6/1967 | Gawron | 318/345 X |
| 3,329,842 | 7/1967 | Brown | 318/345 X |

Primary Examiner—Gene Z. Rubinson
Attorney, Agent, or Firm—Michael J. Striker

[57] ABSTRACT

In a hand-held electric power tool, a combination including an electromotor, and an electric circuit for controlling the speed of the motor, including a pressure switch for controlling the motor speed, a first control potentiometer operatively associated with said pressure switch for adjusting the motor speed from zero up to a predetermined motor operating speed.

12 Claims, 1 Drawing Figure

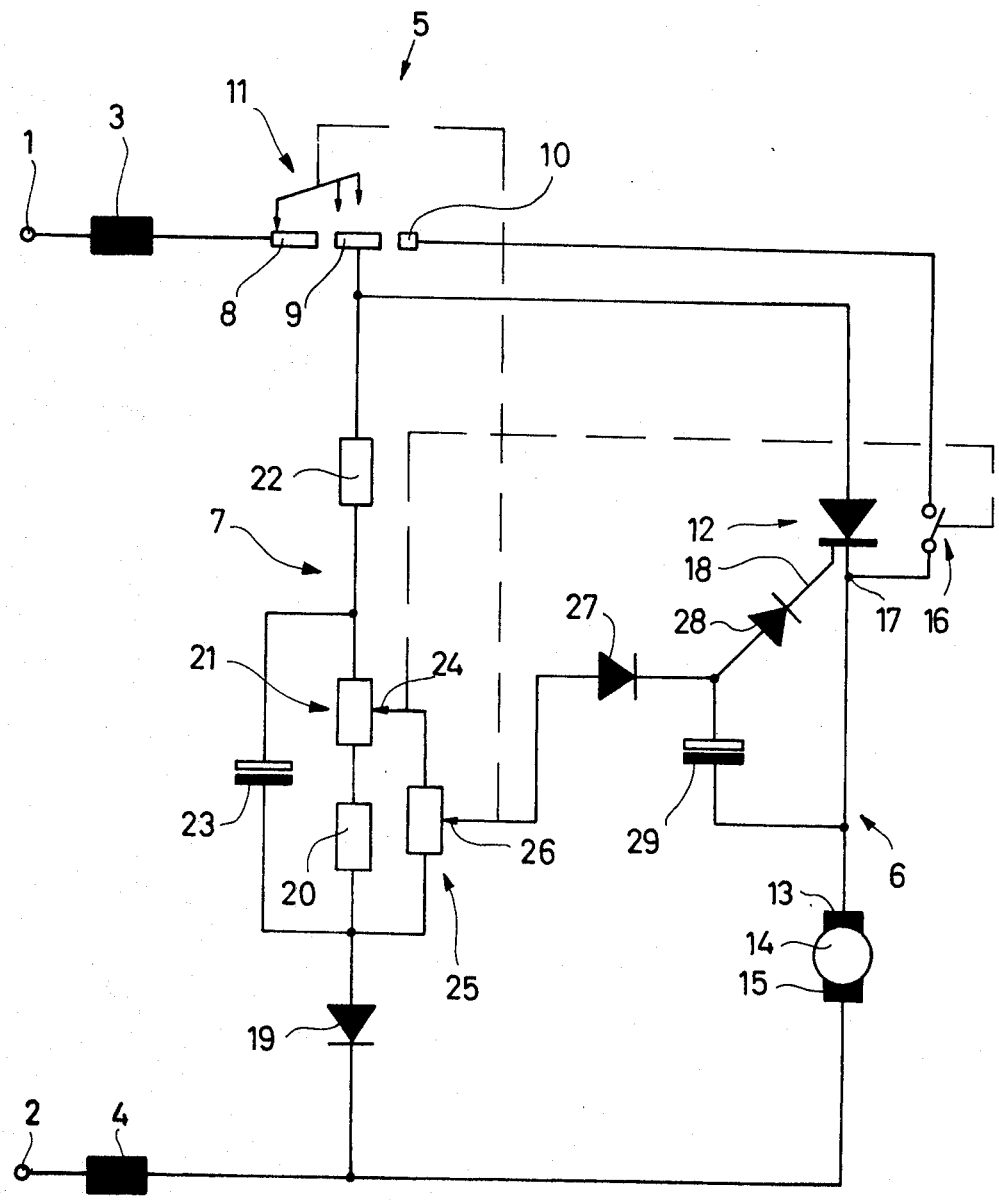

MOTOR SPEED CONTROL FOR POWER TOOL

BACKGROUND OF THE INVENTION

The present invention relates to a speed control circuit for the motor of an electric power tool, particularly a hand-held electric drill with an adjustable drilling speed. Various types of drilling machines are already known in which the fixed drilling speed is maintained independent of the load by means of an electronic regulating circuit. In a second switch position such circuits switch the motor over to the full operating speed. With such switches, a sudden variation or change in rotational speed is possible, perhaps resulting in a sudden reversal of the rotation force, occurring while the user is completely unaware and unprepared for any change, and consequently the machine could even be torn from his hands by the counter-rotational moment. Such a sudden reaction of the drilling machine to a change in direction could result in a high risk of damage or breakage to the mechanism, or even of injury to the user.

SUMMARY OF THE INVENTION

It is an object of the invention to provide a drilling machine which overcomes the disadvantages of the prior art.

Another object of the invention is to provide an electric drill in which the drilling speed is variable by the user in a simple manner without hampering the operation.

Another object of the invention is to provide a control circuit for an electric drill which permits the drilling speed to be adjusted stepwise from zero up to a preselected operating speed by means of a control potentiometer, with the drilling speed being controlled by a pressure-sensitive switch. Thus whenever the motor is turned on, for every selected operating speed, full operating speed could be reached by a gentle increase in speed of the motor, so that the sudden, full impact of the counter-rotational moment would be avoided when the drill is first switched on.

The invention provides that the drilling speed may be adjustable from zero up to a predetermined operating speed by means of a pressure switch. The predetermined operating speed is set on a control potentiometer. Thus with the switching on of the motor, a gradual increase of speed is possible, without encountering the large counter-rotational reaction force characteristic of prior-art devices when the motor is started at its full operational speed. Preferably the drilling speed can be continuously adjustable by means of the pressure switch being connected to a slidable wiper of a potentiometer.

According to the present invention, the voltage to the motor of the drilling machine is controlled by an electrical circuit including a thyristor and two field coils. The thyristor is connected in series with the rotor of the motor in the primary circuit, which is in turn connected to the wiper of the control potentiometer in a voltage divider circuit. It is expedient if the wiper of the control potentiometer is connected to a second potentiometer whose wiper in turn is connected to the control electrode of the thyristor.

The construction of the circuit is particularly simple if the voltage divider circuit is a series connection of a diode with a first fixed resistor, the control potentiometer, and a second fixed resistor. Parallel to the first fixed resistor and the control potentiometer is a condenser. Furthermore, parallel to the first fixed resistor and the control potentiometer through the slide of the control potentiometer is the slide or wiper of the second potentiometer is then connected to the thyristor as noted above. An accurate speed control of the motor is achieved if this slide of the potentiometer is connected through two diodes with the control electrode of the thyristor. Between both diodes a condenser is connected with the output, or the cathode, of the thyristor.

For full high-speed operation, the control potentiometer is shifted to its end position, thereby short-circuiting the thyristor. Thus the full voltage, without any phase change, will flow through the motor. Through the arrangement of a short-circuiting contact on the control potentiometer the motor will reach the highest operating speed without preselection on the control potentiometer, so that operational error is largely prevented. At the same time the predetermined position of the control potentiometer is easily usable, so that the usually provided on-off switch for controlling operation of the motor may be eliminated.

Using an impulse or spring-free pressure switch, one may preferably provide a switch having three contacts which may be connected by means of a bridge. The bridge operates by means of the pressure switch so that in the first or off position all three contacts are seperated from each other, in the second position the first and the middle contact are connected with one another, and in the last position all three contacts are connected with one another. The first contact is electrically connected to a field coil, and, in turn, to one of the poles of the voltage source; the middle contact is connected with a voltage divider circuit, and the end contact is connected to a switch for short-circuiting the thyristor. In a simple manner it is possible to connect the pressure switch with the wiper of the potentiometer in a mechanical coupling, so that the moving of the wiper to the end position will correspond to the closing of the short-circuiting switch.

BRIEF DESCRIPTION OF THE DRAWINGS

The single FIGURE shows a highly simplified schematic diagram of the control circuit for an electric drill according to the present invention.

DESCRIPTION OF THE PREFERRED EMBODIMENTS

The single FIGURE indicates poles 1 and 2 of a voltage source (not shown) connected to field coils 3 and 4 respectively, and thereby to a pressure switch 5 which connects to a primary circuit 6 and a potentiometer circuit 7. The pressure switch 5 comprises a first contact 8, a middle contact 9, and an end contact 10, which are connected together by means of a conducting bridge 11. In the first position of the pressure switch 5 the contacts 8, 9 and 10 are disconnected from one another; in the second position the first contact 8 and the middle contact 9 are connected to one another; and in the third position all three contacts 8, 9 and 10 are connected with one another. The pressure switch 5 is operated by means of pressure switch in the conventional pistol grip of the hand-held electric drill. (not shown).

In the primary circuit 6, the middle contact 9 of the pressure switch is connected through a thyristor 12 to a brush 13, which in turn contacts the rotor 14, and thereby another brush 15 of the operational motor of the drill. The brush 15 is in turn connected to the field coil 4. At the same time the third contact 10 of the pressure switch 5 is connected to a normally open switch 16, which is in turn connected to the output 17 of the thyristor 12, so that in the third position of the pressure switch 5 the contact 8 is connected with the control 10, the switch 16 is closed, the thyrister 12 is short circuited, and the circuit is completed from pole 1 through the field coil 3, the brush 13, the rotor 14, the brush 15 and field coil 4 directly to the other pole 2, so that the motor is driven at maximum power.

The regulation of the rotational speed is controlled by a potentiometer 7 which is connected with the control electrode 18 of the thyristor 12. The phase angle control of the thyristor 12 results from the equalization of the back electromotive force of the rotor 14. The potentiometer circuit 7 comprises a diode 19 in series connection with a first fixed resistor 20, a variable resistor 21, and a second fixed resistor 22, connected between the field coil 4 and the middle contact 9. Between the first fixed resistor 20 and the potentiometer 21 a condenser 23 is connected in parallel. Between the wiper or tap 24 of the potentiometer 21 and the diode 19 another potentiometer 25 is connected, whose tap 26 is connected via two diodes 27 and 28 with the control electrode 18 of the thyristor 12. Between the two diodes 27 and 28 a condenser 29 is connected to the output 17 of the thyristor 12.

The control potentiometer 21 is mechanically coupled with the switch 16, so that in one end position of the wiper 24 the switch 16 is open, and in the other end position of the wiper 24 of the potentiometer 21 the switch 16 is closed, and the thyristor 12 is short circuited. Likewise the wiper 26 of the potentiometer 25 is mechanically connected with the bridge 11 of the pressure switch 5, so that the third position of the pressure switch 5 corresponds to the end position of the wiper 26 of the potentiometer 25.

By sliding the bridge 11 of the pressure switch 5 the contacts 8 and 9 will be connected with one another, so that the current can flow both through the potentiometer circuit 7 and the primary circuit 6. The firing voltage for the control electrode 18 of the thyristor 12 will therefore in a known manner equalize the reference voltage from the potentiometer circuit 7 with the back electromotive force from the rotor 14. With increasing pressure on the pressure switch 5 the potentiometer 25 will increase the reference voltage according to the position of the bridge 11, adjustable up to the end position of the full voltage range of the potentiometer 25, and therefore finally attaining the full voltage at the end position. From this it follows that an increase in rotational speed of the rotor 14 is gradual and is not abrupt as the pressure switch 5 gradually increases the voltage through the potentiometer 25. The wiper 26 of the potentiometer 25 is ajustable for every point of the control potentiometer 21 which may be selected. The control potentiometer 21 is especially sensitive and may be adjusted to low operating speeds, and may be controlled by the position or pressure on the pressure switch 5, so that the rotational speed is adjustable between zero and the desired operating speed.

With switch 16 closed, the shaft rotation will result according to the position of the pressure trigger of the pressure switch 5, with a slow increase of rotational speed. In the end position of switch 5, with all three contacts 8 through 10 connected with one another, the thyristor 12 is short-circuited and a direct connection to the motor is made, so that no sudden changes in rotational speed and therefore sudden and unavoidable reactive rotational forces can occur.

It will be understood that each of the elements described above, or two or more together, may also find a useful application in other types of controrl circuits for electric drills differing from the types described above.

While the invention has been illustrated and described as embodied in electric drill speed control, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. In a hand-held power tool of the type provided with a manually activated pressure switch for initiating tool operation, in combination, an electric motor; a first speed selector settable to a plurality of different top-speed settings; a second speed selector connected to and moved by said manually activated pressure switch from a normal zero-speed setting corresponding to non-activation of said pressure switch to a top-speed setting corresponding to full depressing of said pressure switch, through a plurality of intermediate settings corresponding to intermediate degrees of depressing of said pressure switch; and motor-energizing circuit means connected to said motor and to said first and second selectors and operative when said second selector is progressively moved from its normal zero-speed setting through said intermediate settings to its top-speed setting for effecting a corresponding progressive increase in the energization of said motor such as to cause the motor speed to progressively rise from zero to a top speed corresponding to the setting of said first selector, wherein said first selector and said second selector respectively comprise first and second potentiometers respectively comprised of first and second potentiometer resistors and first and second potentiometer wipers slidable along the respective resistors, the setting of each wiper constituting the setting of the respective speed selector; and wherein said motor-energizing circuit means comprises two voltage supply lines, means connecting said first potentiometer resistor across said two voltage supply lines to form a first voltage divider at whose wiper appears a first voltage determinative of top speed, and means connecting said second potentiometer resistor between said first potentiometer wiper and one terminal of said first voltage divider to form a second voltage divider at whose wiper appears a second voltage equal to a fraction of said first voltage, and regulating means connected between said second potentiometer wiper and said motor for regulating the speed of said motor as a function of said second voltage.

2. In a power tool as defined in claim 1, wherein said first and second speed selectors are settable independently of each other.

3. In a power tool as defined in claim 1, wherein said second speed selector has a substantially continuous range of settings intermediate said zero-speed and top-speed settings thereof.

4. In a power tool as defined in claim 1, wherein each of said selectors has a predetermined range of settings, and wherein each of said selectors is settable to any setting within the respective range irrespective of the setting of the other selector.

5. In a power tool as defined in claim 1, wherein said pressure switch is arrestable in its end position.

6. In a power tool as defined in claim 1, wherein said motor-energizing circuit means comprises an electronic switch element connected in the motor current path, said regulating means comprising means for regulating the speed of said electric motor by controlling the conductivity of said electronic switch element in dependence upon the settings of both said first and said second speed selectors, and means connected to said first speed selector and operative for short-circuiting said electronic switch element when said first speed selector is moved to the highest one of its top-speed settings.

7. In a power tool as defined in claim 1, wherein said first voltage divider includes a fixed resistor, said first potentiometer resistor having one terminal connected to one supply line and having another terminal, said fixed resistor having one terminal directly connected to said other terminal of said first potentiometer resistor and having another terminal connected to the other supply line, and wherein said second potentiometer resistor has one terminal directly connected to said first potentiometer wiper and another terminal directly connected to said other terminal of said fixed resistor.

8. In a power tool as defined in claim 1, wherein said electric motor has a motor current path connected between said supply lines, and wherein said regulating means comprises a thyristor having an anode-cathode path connected in said motor current path and having a gate electrode connected to said second potentiometer wiper.

9. In a power tool as defined in claim 8, wherein said regulating means comprises two diodes connected in series with the same polarity between said second potentiometer wiper and said control electrode of said thyristor, and a capacitor connecting the junction between said two series-connected diodes to the cathode of said thyristor.

10. In a power tool as defined in claim 1, wherein said first voltage divider is comprised of the series connection of a diode, a first fixed resistor, said first potentiometer resistor, and a second fixed resistor, further including a capacitor connected in parallel to the series connection of said first fixed resistor and said first potentiometer resistor, and wherein said second potentiometer resistor has one terminal directly connected to said first potentiometer wiper and another terminal directly connected to that terminal of said first fixed resistor not connected to said first potentiometer resistor.

11. In a hand-held power tool of the type provided with a manually activated pressure switch for initiating tool operation, in combination, an electric motor; a first speed selector settable to a plurality of different top-speed settings; a second speed selector connected to and moved by said manually activated pressure switch from a normal zero-speed setting corresponding to non-activation of said pressure switch to a top-speed setting corresponding to full depressing of said pressure switch, through a plurality of intermediate settings corresponding to intermediate degrees of depressing of said pressure switch; and motor-energizing circuit means connected to said motor and to said first and second selectors and operative when said second selector is progressively moved from its normal zero-speed setting through said intermediate settings to its top-speed setting for effecting a corresponding progressive increase in the energization of said motor such as to cause the motor speed to progressively rise from zero to a top speed corresponding to the setting of said first selector, wherein said first speed selector comprises a voltage divider having an adjustable voltage divider tap, and wherein said motor-energizing circuit means comprises two voltage supply lines, an electronic switch element connected in the current path of said motor, motor speed regulating means connected between said tap and the control electrode of said electronic switch element, a three-contact electrical switch having a first, a second and a third electrical contact and a conductive switch element coupled to said pressure switch and arranged so that when said pressure switch is progressively depressed said switch element progressively establishes electrical connections between said first and second contacts and then all three contacts, said first contact being connected to one voltage supply line, said voltage divider being connectable across said voltage supply lines via said second contact, and said motor current path being connectable across said voltage supply lines via said third contact.

12. In a power tool as defined in claim 11, wherein said voltage divider tap is mechanically coupled to said manually activated pressure switch for movement thereby, and wherein the end positions of said wiper correspond to the end positions of said pressure switch.

* * * * *